(12) United States Patent
Ono

(10) Patent No.: US 9,598,164 B2
(45) Date of Patent: Mar. 21, 2017

(54) WASTE HEAT RECOVERY SYSTEM FOR VESSEL

(71) Applicant: YANMAR CO., LTD., Osaka (JP)

(72) Inventor: Taisuke Ono, Osaka (JP)

(73) Assignee: YANMAR CO., LTD., Osaka (JP)

( * ) Notice: Subject to any disclaimer, the term of this patent is extended or adjusted under 35 U.S.C. 154(b) by 114 days.

(21) Appl. No.: 14/383,451

(22) PCT Filed: Mar. 1, 2013

(86) PCT No.: PCT/JP2013/055708
§ 371 (c)(1),
(2) Date: Sep. 5, 2014

(87) PCT Pub. No.: WO2013/133174
PCT Pub. Date: Sep. 12, 2013

(65) Prior Publication Data
US 2015/0052896 A1 Feb. 26, 2015

(30) Foreign Application Priority Data

Mar. 7, 2012 (JP) ................................ 2012-051060

(51) Int. Cl.
*B63J 3/02* (2006.01)
*F22B 1/18* (2006.01)
*F02G 5/02* (2006.01)
*F01K 13/02* (2006.01)
*F01K 23/10* (2006.01)
*F01K 23/06* (2006.01)
*B63J 3/00* (2006.01)

(52) U.S. Cl.
CPC ................. *B63J 3/02* (2013.01); *F01K 13/02* (2013.01); *F01K 23/065* (2013.01); *F01K 23/101* (2013.01); *F02G 5/02* (2013.01); *F22B 1/1807* (2013.01); *B63J 2003/008* (2013.01); *Y02T 10/166* (2013.01); *Y02T 70/5281* (2013.01)

(58) Field of Classification Search
CPC ....... B63J 3/02; B63J 2003/008; F01K 13/02; F01K 23/065; F01K 23/101; F22B 1/1807; F02G 5/02; Y02T 70/5281
See application file for complete search history.

(56) References Cited

FOREIGN PATENT DOCUMENTS

| CN | 2534658 Y | | 2/2003 |
|---|---|---|---|
| JP | 2008175108 A | * | 7/2008 |
| JP | 2010144995 A | | 7/2010 |

OTHER PUBLICATIONS

International Search Report for Application No. PCT/JP2013/055708; Date of mailing, Jun. 4, 2013; with English Translation.

* cited by examiner

*Primary Examiner* — Audrey K Bradley
(74) *Attorney, Agent, or Firm* — Cantor Colburn LLP

(57) ABSTRACT

A waste heat recovery system for a vessel for supplying to a plurality of scroll expanders which are connected in parallel to one another, steam generated by a heat exchanger using waste heat from a main machine as a heat source, may include gate valves corresponding to respective scroll expanders and an electronic controller which controls the number of the scroll expanders which drives based on flow volume of the steam by opening or closing of the gate valves.

2 Claims, 7 Drawing Sheets

(a)

(b)

WASTE HEAT RECOVERY SYSTEM FOR VESSEL

CROSS REFERENCE TO RELATED APPLICATIONS

This is the U.S. national stage of application No. PCT/JP2013/055708, filed on Mar. 1, 2013. Priority under 35 U.S.C. §119(a) and 35 U.S.C. §365(b) is claimed from Japanese Application No. 2012-051060, filed Mar. 7, 2012, the disclosure of which is also incorporated herein by reference.

TECHNICAL FIELD

The present invention relates a waste heat recovery system for a vessel.

BACKGROUND ART

Conventionally, with respect to a vessel, a waste heat recovery system for the vessel which generates steam at high temperature and high pressure by recovering waste heat from a main machine configured from a diesel engine, etc. has been publicly known. The generated steam is utilized as power source for generating electric power, or is supplied to a steam utilization device that is mounted on the vessel. With respect to such waste heat recovery system for the vessel, a technique of enhancing the waste heat utilization efficiency by absorbing fluctuation in steam volume by utilizing an excess steam for precooling a refrigerator etc. so as to efficiently utilize excess steam that fluctuates corresponding to usage conditions of the steam utilization device has been known. Such explanation can be seen in Patent Literature 1.

PRIOR ART DOCUMENTS

Patent Literature

Patent Literature 1: the Japanese Patent Laid Open Gazette 2010-144995

SUMMARY OF THE INVENTION

Problems to be Solved by the Invention

However, in the technique disclosed in Patent Literature 1, excess steam volume supplied to the refrigerator for precooling corresponding to usage conditions of the steam utilization device fluctuates. Particularly in the winter season when temperature is low, the flow volume of excess steam supplied to the refrigerator is reduced largely, and thereby the efficiency of the refrigerator decreases. And it is disadvantageous that, installing inefficient devices in the vessel where the installation area is limited will result in deterioration of space efficiency The present invention has been made in view of the above mentioned problems, and it is the object of the present invention to provide a waste heat recovery system for a vessel capable of efficiently recovering waste heat regardless of a flow volume of excess steam.

Means for Solving the Problems

Disclosed herein is a waste heat recovery system for a vessel for supplying, to a steam utilization device, steam generated by a steam generator, using waste heat from a main machine as a heat source. With respect to the waste heat recovery system for the vessel, a plurality of expansion machines are connected in parallel to one another, and excess steam without being supplied to the steam utilization device is supplied individually to the expansion machines by the opening/closing of gate valves arranged in the respective expansion machines respectively.

With respect to the waste heat recovery system for the vessel, further comprising a control device, the plurality of expansion machines are configured to have the same capacity. When the flow volume of excess steam supplied to the expansion machines exceeds an upper limit value of an allowable supply amount that is determined from the combination of the expansion machines, the gate valve of the one expansion machine among the plurality of expansion machines in which excess steam is not supplied is open, whereas when the flow volume of excess steam supplied to the expansion machines is equal to or lower than a lower limit value of the allowable supply amount, the gate valve of the one expansion machine among the plurality of expansion machines in which excess steam is supplied is closed.

With respect to the waste heat recovery system for the vessel, the control device is programmed to control such that, the gate valve of the one expansion machine that is least frequently used among the plurality of expansion machines in which excess steam is not supplied is open, whereas the gate valve of the one expansion machine that is most frequently used among the plurality of expansion machines in which excess steam is supplied is closed.

With respect to the waste heat recovery system for the vessel, a control device is further included. With respect to the waste heat recovery system for the vessel, the plurality of expansion machines are configured from a combination of the different capacity. The gate valve is open/closed such that the flow volume of excess steam is included, at a combination in which the number of expansion machines is minimum, in a range between a lower limit value and an upper limit value of an allowable supply amount that is determined from the combination of the expansion machines.

Effects of the Invention

The present invention exerts effects described below.

According to the present invention, excess steam can be selectively supplied to the one of or to the plurality of the expansion machines. As such, waste heat can be efficiently recovered regardless of a flow volume of excess steam.

According to the present invention, excess steam can be selectively supplied to the one of or to the plurality of the expansion machines taking efficiency of expansion machines into consideration from the supply volume of excess steam. As such, waste heat can be efficiently recovered regardless of the flow volume of excess steam.

According to the present invention, the frequency of usage of the respective expansion machines connected to one another are kept approximately constant, and thereby individual difference of efficiency of respective expansion machines due to secular change can be reduced. As such, while maintaining the efficiency of the waste heat recovery system for the vessel, waste heat can be efficiently recovered regardless of the flow volume of excess steam.

According to the present invention, excess steam can be selectively supplied to the most suitable combination of the expansion machines taking efficiency of expansion machines into consideration from the supply volume of excess steam. As such, waste heat can be efficiently recovered regardless of the flow volume of excess steam.

DESCRIPTION OF EMBODIMENTS

Figure 1:
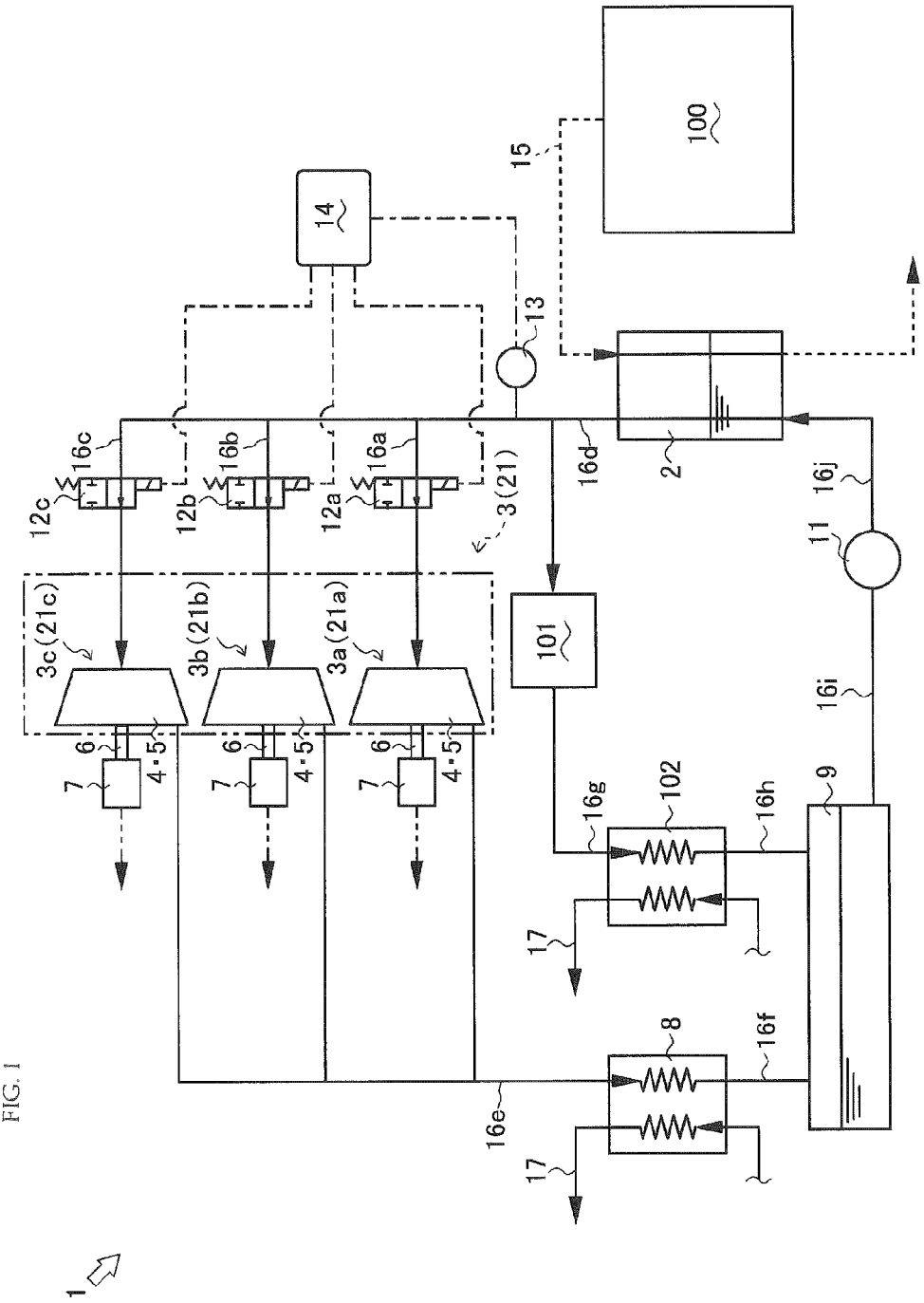
FIG. 1 It is a schematic view illustrating a configuration of a waste heat recovery system for a vessel which is a first embodiment and a second embodiment of the present invention.

Hereinafter, an explanation will be given of the best mode for carrying out the present invention with reference to the drawings.

First of all, an explanation will be given of a configuration of a waste heat recovery system 1 for a vessel according to a first embodiment of the present invention with reference to FIG. 1 and FIG. 2.

The waste heat recovery system 1 for the vessel utilizes water (steam) as working medium. The waste heat recovery system 1 for the vessel generates electric power, using waste heat from a main machine 100 configured from a diesel engine as a heat source, and concurrently, the waste heat recovery system 1 for the vessel supplies steam to a steam utilization device 101. As shown in FIG. 1, the waste heat recovery system 1 for the vessel includes a steam generation device 2, a scroll type fluid machine group 3, electric generators 7, a first compressor 8, a condensate tank 9, a working medium supply pump 11, gate valves 12a, 12b, 12c, and a control device 14.

The steam generation device 2 heats water as working medium by exhaust gas etc. of the main machine 100, and thereby generates steam at high temperature and high pressure. The steam generation device 2 generates steam through heat exchange between working medium (water condensed from steam by the below-mentioned first compressor 8) and exhaust gas. The steam generation device 2 is connected to the main machine 100 through an exhaust passage 15, and is connected to the scroll type fluid machine group 3 though a working medium passage 16d. Steam generated by the steam generation device 2 is supplied to the scroll type fluid machine group 3 through the working medium passage 16d.

In the present embodiment, heat source is exhaust gas of the main machine 100. However, heat source is not limited to this.

The scroll type fluid machine group 3 is constituted from scroll type fluid machines 3a, 3b, 3c that are expansion machines. The scroll type fluid machines 3a, 3b, 3c converts the energy of steam into a rotational force and outputs it. The scroll type fluid machine group 3 is connected to the working medium passage 16d that is connected to the steam utilization device 101 in the vessel. The scroll type fluid machine group 3 is connected to downstream side of the steam utilization device 101. Specifically, the scroll type fluid machines 3a, 3b, 3c are connected to the working medium passage 16d in parallel through working medium passages 16a, 16b, 16c. In the present embodiment, the scroll type fluid machine group 3 is constituted from the three scroll type fluid machines 3a, 3b, 3c. However, the number of the scroll type fluid machines is not limited to this. The scroll type fluid machines 3a, 3b, 3c mainly include fixed scrolls 4, movable scrolls 5, and crank shafts 6.

Figure 2:
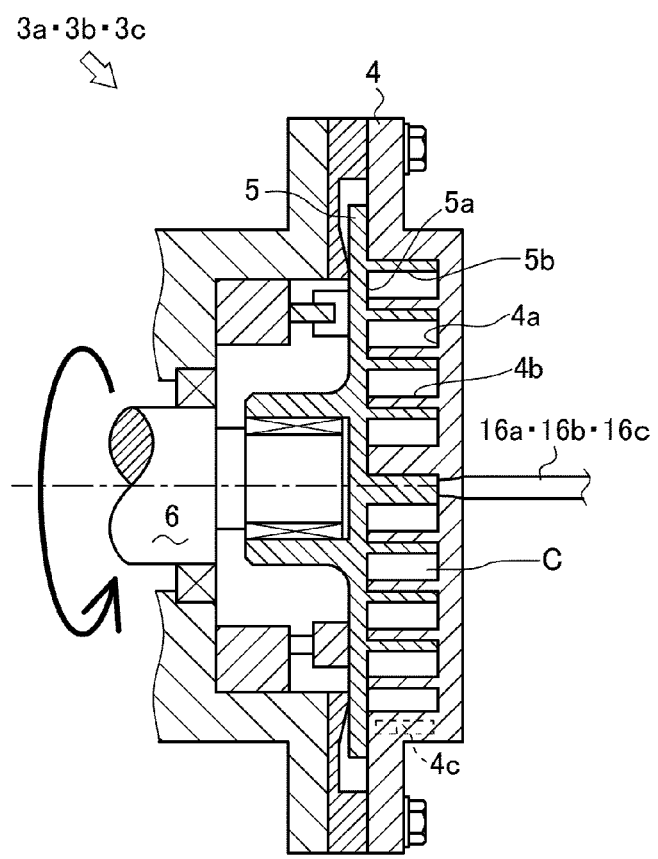
FIG. 2 It is a cross-sectional view of a scroll type fluid machine according to the present invention.

As shown in FIG. 2, the fixed scroll 4 is a member constituting an expansion chamber C. The fixed scroll 4 is constituted from an end plate 4a and fixed scroll laps 4b that are formed on one side plate surface of the end plate 4a. The fixed scroll laps 4b are formed based on a so-called involute curve. A steam discharge port 4c is provided in the outer edge part of the fixed scroll 4. For the scroll type fluid machines 3a, 3b, 3c, the steam discharge ports 4c are connected to the after-mentioned first compressor 8 through a working medium passage 16e.

The movable scroll 5 is a member constituting the expansion chamber C. The movable scroll 5 is constituted from an end plate 5a and movable scroll laps 5b that are formed on one side plate surface of the end plate 5a. The movable scroll laps 5b are formed based on the so-called involute curve. For the movable scroll 5, the movable scroll laps 5b facing the fixed scroll laps 4b are inserted into gaps between the fixed scroll laps 4b and thereby the expansion chamber C is formed. The crank shaft 6 is rotated by turning motion of the movable scroll 5. With respect to the scroll type fluid machine 3a, 3b, 3c, the one crank shaft 6 is rotated by turning motion of the movable scroll 5. However, the configuration is not limited to this.

As shown in FIG. 1, the electric generators 7 generate electricity by a drive force from outside. The each electric generator 7 is connected to the each crank shaft 6 of the scroll type fluid machine 3a, 3b, 3c. That is to say, the electric generator 7 is configured to be capable of generating electricity by a rotation of the crank shaft 6. The electricity generated by the electric generator 7 is supplied outside of the waste heat recovery system 1 for the vessel.

Steam is cooled down and compressed (condensed) by water supply in the first compressor 8 and a second compressor 102. Steam that is a working medium is supplied to the first compressor 8 from the scroll type fluid machines 3a, 3b, 3c through the working medium passage 16e. The first compressor 8 condenses the steam by heat exchange between the working medium and the feed-water supplied through a cooling water passage 17. The first compressor 8 is connected to the condensate tank 9 through a working medium passage 16f. Steam that is the working medium is supplied to the second compressor 102 from the steam utilization device 101 through a working medium passage 16g. The second compressor 102 condenses the steam by heat exchange between the working medium and the feed-water supplied through the cooling water passage 17. The second compressor 102 is connected to the condensate tank 9 through a working medium passage 16h. The water condensed in the first compressor 8 and the second compressor 102 is supplied to the condensate tank 9 through the working medium passages 16f, 16h.

The water condensed by the first compressor 8 and the second compressor 102 is stored in the condensate tank 9. The condensate tank 9 is connected to the working medium supply pump 11 through a working medium passage 16i.

The working medium in the condensate tank 9 is supplied to the steam generation device 2 through the working medium supply pump 11. The working medium supply pump 11 is connected to the steam generation device 2 through a working medium passage 16j. And the working medium supply pump 11 supplies the working medium to the steam generation device 2 through the working medium passage 16i and the working medium passage 16j.

The working medium passages 16a, 16b, 16c are communicated or blocked up by opening/closing the gate valves 12a, 12b, 12c. The gate valves 12a, 12b, 12c are configured from electromagnetic type automatic valves. The working medium passages 16a, 16b, 16c respectively have gate valves 12a, 12b, 12c. The gate valves 12a, 12b, 12c are controlled to be opened when supplying steam to the scroll type fluid machines 3a, 3b, 3c, whereas the gate valves 12a, 12b, 12c are controlled to be closed when steam is not supplied to the scroll type fluid machines 3a, 3b, 3c.

A flow volume sensor 13 measures the flow volume of excess steam. The flow volume sensor 13 is connected to the working medium passage that is connected to the steam utilization device 101. The flow volume sensor 13 is positioned more on a downstream side than the steam utilization device 101, and more on an upstream side than the scroll type fluid machine group 3. Accordingly, a flow volume F of excess steam that is not supplied to the steam utilization device 101 can be measured by the flow volume sensor 13.

The control device 14 controls the waste heat recovery system 1 for the vessel in accordance with thermal demand. The control device 14 stores a variety of programs and data for controlling the waste heat recovery system 1 for the vessel. The control device 14 may have a configuration consisting of LSI or the like of the one-chip or may be a configuration in which CPU, ROM, RAM, HDD and the like are connected by a bus.

The control device 14 is connected to various devices, for example solenoids of the gate valves 12a, 12b, 12c, which constitute the waste heat recovery system 1 for the vessel, and is capable of controlling the open/closed state of the gate valves 12a, 12b, 12c. And the control device 14 is connected to the flow volume sensor 13, and thereby the control device 14 can receive signals of excess steam flow volume F detected by the flow volume sensor 13.

With respect to the waste heat recovery system 1 of the vessel having such configuration, among steam generated by the steam generation device 2, excess steam that has not been supplied to the steam utilization device 101 is supplied to the scroll type fluid machine group 3. Excess steam is supplied to any of scroll type fluid machines 3a, 3b, 3c selectively depending on the flow volume of excess steam. For the scroll type fluid machines 3a, 3b, 3c, when excess steam is supplied to the expansion chamber C, the crank shaft 6 supported by the movable scroll 5 is rotated by the steam force which attempts to push and spread the expansion chamber C. The electric generators 7 connected to the crank shafts 6 are driven by the scroll type fluid machines 3a, 3b, 3c. Steam exhausted from the scroll type fluid machines 3a, 3b, 3c is condensed by the first compressor 8, and then fed to the steam generation device 2.

Figure 3:
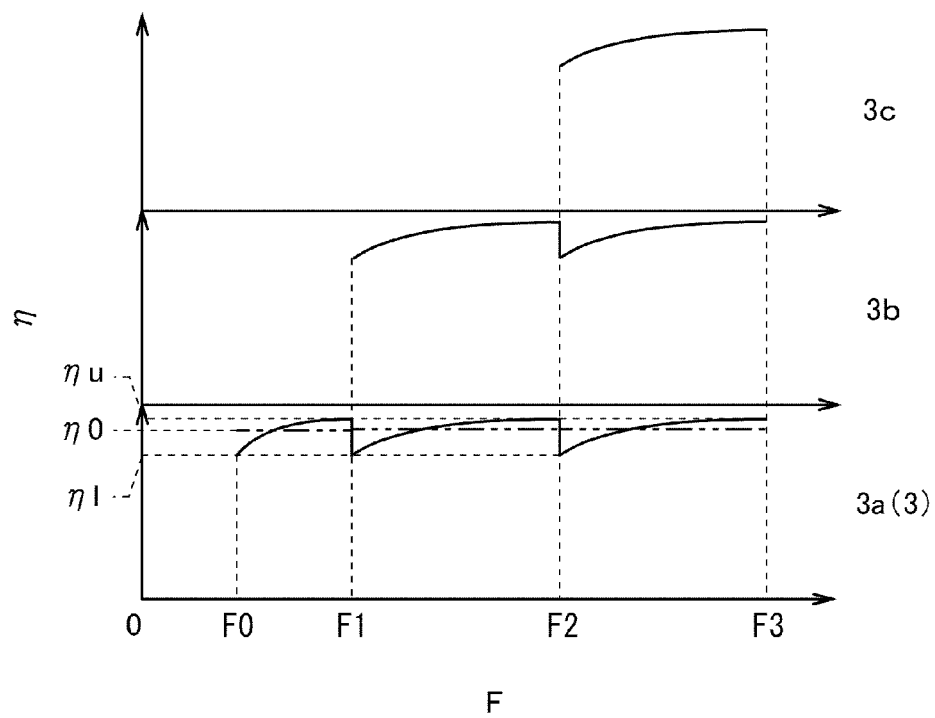
FIG. 3 It is a figure showing efficiency of the scroll type fluid machine according to the waste heat recovery system for the vessel which is the first embodiment of the present invention.
Figure 3:
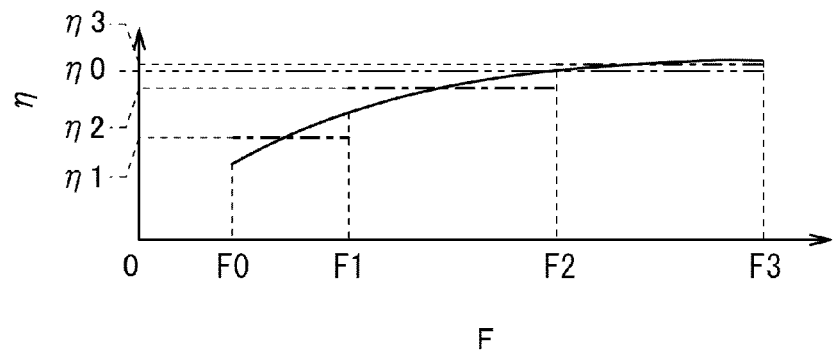

Next, an explanation will be given of efficiency of the scroll type fluid machine group 3 with respect to the waste heart recovery system 1 for the vessel with reference to FIG. 3.

FIG. 3(a) and FIG. 3(b) show $\eta$-F diagram (flow volume diagram between efficiency ($\eta$) and the flow volume (F) of excess steam) with respect to the present embodiment. The flow volume F indicates the flow volume of excess steam supplied to the scroll type fluid machine group 3 (that is, "the scroll type fluid machines" in FIG. 3(b)) (see FIG. 1). Efficiency $\eta$ indicates the ratio of workload outputted with respect to the flow volume of supplied steam in the scroll type fluid machine group 3 (that is, "the scroll type fluid machines" in FIG. 3(b)). That is to say, as efficiency $\eta$ becomes larger, steam energy that has been supplied is effectively transformed into work, and thereby waste heat utilization efficiency is enhanced.

The solid line diagram in FIG. 3(a) indicates efficiency $\eta$ of the scroll type fluid machines 3a, 3b, 3c. The present diagram indicates that, excess steam is additionally supplied to additional scroll type fluid machine in order of the scroll type fluid machine 3a, the scroll type fluid machine 3b, and the scroll type fluid machine 3c in response to an increase in the flow volume F. The solid line diagram in FIG. 3(b) indicates efficiency $\eta$ of the scroll type fluid machine whose volume is capable of supplying the entire excess steam.

As shown in FIG. 3(a), a flow volume F0 is the flow volume of excess steam supplied to the scroll type fluid machine group 3 when steam is supplied to the entire steam utilization device 101. That is to say, not less than the flow volume F0 of excess steam is supplied to the scroll type fluid machine group 3 consistently.

A flow volume F1 is the supply amount (referred to as "allowable supply amount F1", hereinafter) of excess steam in which efficiency $\eta$ of the scroll type fluid machine group 3 reaches an upper limit value $\eta u$ when excess steam is supplied to any one of the scroll type fluid machines among the scroll type fluid machines 3a, 3b, 3c of the scroll type fluid machine group 3. In this state, efficiency $\eta$ decreases when the allowable supply amount F1 or more of excess steam is supplied to the scroll type fluid machine group 3. Also, the allowable supply amount F1 is the supply amount of excess steam in which efficiency $\eta$ of the scroll type fluid machine group 3 reaches a lower limit value $\eta l$ when excess steam is supplied to any two of the scroll type fluid machines among the scroll type fluid machines 3a, 3b, 3c of the scroll type fluid machine group 3. In this state, efficiency $\eta$ further decreases when the allowable supply amount F1 or less of excess steam is supplied to the scroll type fluid machine group 3.

A flow volume F2 is the supply amount (referred to as "allowable supply amount F2", hereinafter) of excess steam in which efficiency $\eta$ of the scroll type fluid machine group 3 reaches the upper limit value $\eta u$ when excess steam is supplied to any two of the scroll type fluid machines among the scroll type fluid machines 3a, 3b, 3c of the scroll type fluid machine group 3. In this state, efficiency $\eta$ decreases when the allowable supply amount F2 or more of excess steam is supplied to the scroll type fluid machine group 3. Also, the flow volume F2 is the supply amount of excess steam in which efficiency $\eta$ of the scroll type fluid machine group 3 reaches the lower limit value $\eta l$ when excess steam is supplied to all of the scroll type fluid machines 3a, 3b, 3c constituting the scroll type fluid machine group 3. In this state, efficiency $\eta$ further decreases when the allowable supply amount F2 or less of excess steam is supplied to the scroll type fluid machine group 3.

A flow volume F3 is the supply amount (referred to as "allowable supply amount F3", hereinafter) of excess steam in which efficiency $\eta$ of the scroll type fluid machine group 3 reaches the upper limit value $\eta u$ when excess steam is supplied to all of the scroll type fluid machines 3a, 3b, 3c constituting the scroll type fluid machine group 3.

Next, an explanation will be given of an aspect of change in efficiency $\eta$ of the scroll type fluid machine group 3 when the flow volume F is increased from the flow volume F0 to the allowable supply amount F3, with respect to the waste heat recovery system 1 for the vessel, with reference to FIG. 3(a).

When the flow volume F is the allowable supply amount F1 or less, excess steam is supplied to the scroll type fluid machine 3a. When the flow volume F reaches the allowable supply amount F1, efficiency $\eta$ of the scroll type fluid machine 3a reaches the upper limit value $\eta u$. That is to say, with respect to this state, the allowable supply amount F1 is the upper limit value of an allowable supply amount of the scroll type fluid machine group 3.

When the flow volume F is more than the allowable supply amount F1, excess steam is supplied to the scroll type fluid machine 3a and the scroll type fluid machine 3b. Accordingly, the amount of excess steam supplied to the respective scroll type fluid machines 3a, 3b decreases, and thereby efficiency $\eta$ is decreased. In this state, efficiency $\eta$ of each scroll type fluid machine 3a, 3b is the lower limit value $\eta l$. When the flow volume F reaches the allowable supply amount F2, efficiency $\eta$ of the scroll type fluid machine 3a, 3b reaches the upper limit value $\eta u$. That is to say, with respect to this state, the allowable supply amount F2 is the upper limit value of an allowable supply amount of the scroll type fluid machine group 3.

When the flow volume F is more than the allowable supply amount F2, excess steam is supplied to the scroll type fluid machine 3a, the scroll type fluid machine 3b and the scroll type fluid machine 3c. Accordingly, the amount of excess steam supplied to the respective scroll type fluid machines 3a, 3b, 3c decreases, and thereby efficiency $\eta$ is decreased. In this state, efficiency $\eta$ of each scroll type fluid machine 3a, 3b, 3c is the lower limit value $\eta l$. When the flow volume F reaches the allowable supply amount F3, efficiency $\eta$ of the scroll type fluid machine 3a, 3b, 3c reaches the upper limit value $\eta u$. That is to say, with respect to this state, the allowable supply amount F3 is the upper limit value of an allowable supply amount of the scroll type fluid machine group 3.

Efficiency of the scroll type fluid machine group 3 between the flow volume F0 and the allowable supply amount F3 can be presented as a mean efficiency $\eta 0$ (see two-dotted line diagram in FIG. 3(a)). In the present embodiment, excess steam is supplied additionally to the additional scroll type fluid machine in order of the scroll type fluid machine 3a, the scroll type fluid machine 3b and the scroll type fluid machine 3c. However, the order of supplying is not limited to this.

Next, an explanation will be given of an aspect of change in efficiency $\eta$ of the scroll type fluid machine group 3 when the flow volume F is decreased from the allowable supply amount F3 to the flow volume F0 with respect to the waste heat recovery system 1 for the vessel of the present embodiment.

When the flow volume F is the allowable supply amount F3, excess steam is supplied to the scroll type fluid machines 3a, 3b, 3c. When the flow volume F reaches the allowable supply amount F2, efficiency $\eta$ of the scroll type fluid machine group 3 reaches the lower limit value $\eta 1$. That is to say, with respect to this state, the allowable supply amount F2 is the lower limit value of an allowable supply amount of the scroll type fluid machine group 3.

When the flow volume F is less than the allowable supply amount F2, supply of excess steam to the scroll type fluid machine 3c is stopped so that efficiency $\eta$ does not go below the lower limit value $\eta l$ in a condition such that the flow volume F is the allowable supply amount F2 or less, whereas excess steam is supplied to the scroll type fluid machine 3a and the scroll type fluid machine 3b. Accordingly, the amount of excess steam supplied to the respective scroll type fluid machines 3a, 3b increases, and thereby efficiency $\eta$ is increased. In this state, efficiency $\eta$ of each scroll type fluid machine 3a, 3b is the upper limit value $\eta u$. When the flow volume F reaches the allowable supply amount F1, efficiency $\eta$ of the scroll type fluid machine 3a, 3b reaches the lower limit value $\eta l$. That is to say, with respect to this state, the allowable supply amount F1 is the lower limit value of an allowable supply amount of the scroll type fluid machine group 3.

When the flow volume F is less than the allowable supply amount F1, supply of excess steam to the scroll type fluid machines 3b, 3c is stopped so that efficiency $\eta$ does not go below the lower limit value $\eta l$ in a condition such that the flow volume F is the allowable supply amount F1 or less, whereas excess steam is supplied to the scroll type fluid machine 3a. Accordingly, the amount of excess steam supplied to the scroll type fluid machine 3a increases, and thereby efficiency $\eta$ is increased. In this state, efficiency $\eta$ of each scroll type fluid machine 3a is the upper limit value $\eta u$. When the flow volume F reaches the flow volume F0, efficiency $\eta$ of the scroll type fluid machine 3a reaches the lower limit value $\eta l$.

Next, an explanation will be given of efficiency $\eta$ in a case in which the flow volume F is increased from the flow volume F0 to the allowable supply amount F3 with respect to a scroll type fluid machine whose volume is capable of supplying the entire excess steam with reference to FIG. 3(b).

The scroll type fluid machine is configured to exert maximum efficiency $\eta$ in a case in which the flow volume F is the allowable supply amount F3. Accordingly, when the flow volume F is the allowable supply amount F1 of the scroll type fluid machine or less, only the flow volume of $\leq 1/3$ of the allowable supply amount F3 that exerts the maximum efficiency $\eta$ is supplied to the scroll type fluid machine. Accordingly, a mean efficiency $\eta 1$ of the scroll type fluid machine between the flow volume F0 to the allowable supply amount F1 is less than the mean efficiency $\eta 0$ of the scroll type fluid machine group 3 (see one-dotted line in FIG. 3(b)).

Likewise, when the flow volume F is between the allowable supply amount F1 and the allowable supply amount F2, only the flow volume of $\leq 2/3$ of the allowable supply amount F3 that exerts the maximum efficiency $\eta$ is supplied to the scroll type fluid machine. Accordingly, a mean efficiency $\eta 2$ of the scroll type fluid machine between the allowable supply amount F1 and the allowable supply amount F2 is less than the mean efficiency $\eta 0$ of the scroll type fluid machine group 3 (see one-dotted line in FIG. 3(b)).

When the flow volume F is between the allowable supply amount F2 and the allowable supply amount F3, the flow volume of $\geq 2/3$ of the allowable supply amount F3 that exerts the maximum efficiency $\eta$ is supplied to the scroll type fluid machine. Accordingly, a mean efficiency $\eta 3$ of the scroll type fluid machine between the allowable supply amount F2 and the allowable supply amount F3 is higher than the mean efficiency η0 of the scroll type fluid machine group 3 (see one-dotted line in FIG. 3(*b*)).

Accordingly, when the flow volume F of excess steam is the allowable supply amount F2 or less, the scroll type fluid machine group 3 exerts higher efficiency η than that of the scroll type fluid machine whose volume is capable of supplying the entire excess steam. That is to say, even in a state where the flow volume F of excess steam has been decreased, excess steam energy is effectively transformed into work by the scroll type fluid machine group 3. As such, compared to the scroll type fluid machine whose volume is capable of supplying the entire excess steam, waste heat utilization efficiency is higher.

Hereinafter, an explanation will be given of an operation aspect of the control device 14 with respect to the waste heat recovery system 1 for the vessel that has the above-mentioned configuration with reference to FIG. 1 and FIG. 4.

As shown in FIG. 1, the control device 14 receives signals of the flow volume F of excess steam from the flow volume sensor 13. Based on the information received from the sensor 13, the control device 14 controls the open/closed state of the gate valves 12*a*, 12*b*, 12*c*.

Figure 4:
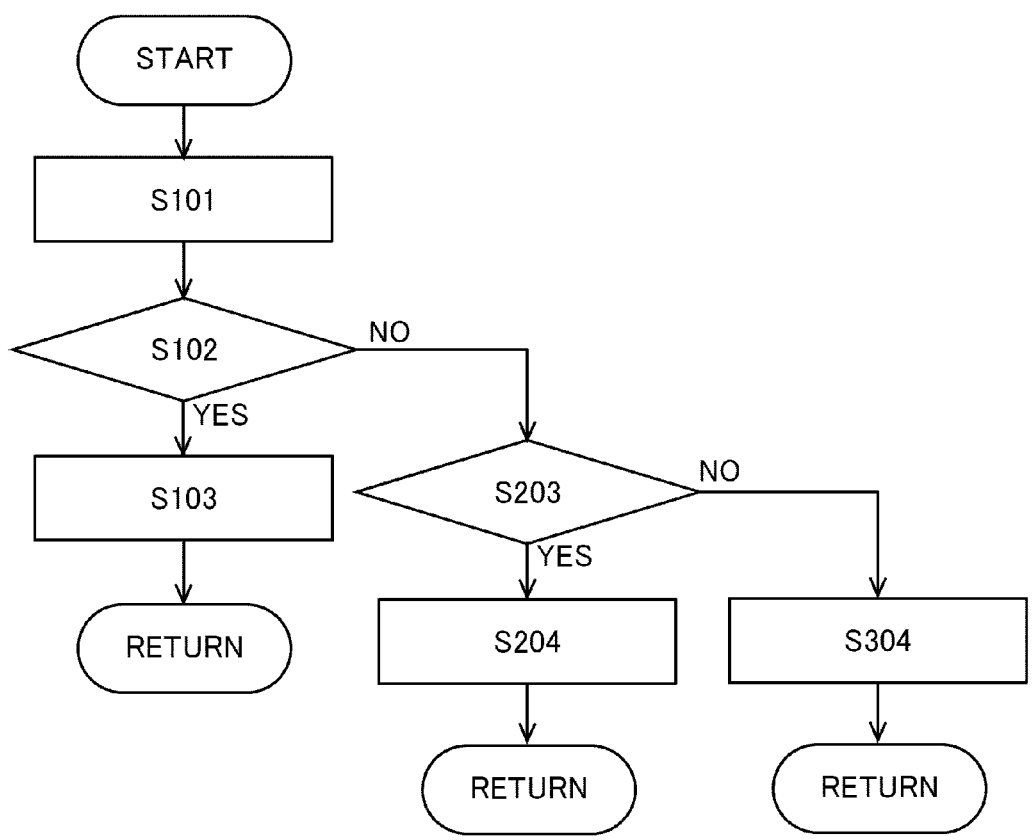
FIG. 4 It is a flowchart showing a control procedure of gate valves according to the waste heat recovery system for the vessel which is the first embodiment of the present invention.

As shown in FIG. 4, the control device 14 controls the open/closed state of the gate valves 12*a*, 12*b*, 12*c* in accordance with the following steps.

First of all, in step S101, the control device 14 receives signals of the flow volume F of excess steam from the flow volume sensor 13 that is connected to the control device 14.

In step S102, the control device 14 judges from the signals of the flow volume F of excess steam whether the flow volume F is the allowable supply amount F1 that is the upper limit value of the allowable supply amount or less. As a result, when the flow volume F is judged as the allowable supply amount F1 that is the upper limit value of the allowable supply amount or less, the control device 14 makes the shift to step S103. Meanwhile, when the flow volume F is not judged as the allowable supply amount F1 that is the upper limit value of the allowable supply amount or less, the control device 14 makes the shift to step S203.

In step S103, the control device 14 controls opening/closing of the gate valves 12*a*, 12*b*, 12*c* so as to keep any one of the gate valves 12*a*, 12*b*, 12*c* (in the present embodiment, the gate valve 12*a*) in an open state. That is to say, excess steam is supplied to any one of the scroll type fluid machines 3*a*, 3*b*, 3*c* (in the present embodiment, the scroll type fluid machine 3*a*) of the scroll type fluid machine group 3. As such, efficiency η of the scroll type fluid machine group 3 does not drop lower than the lower limit value η1. After that, the step is returned to step S101 by the control device 14.

In step S203, the control device 14 judges from the signals of the flow volume F of excess steam whether the flow volume F is the allowable supply amount F2 that is the upper limit value of the allowable supply amount or less. That is to say, the control device 14 judges whether the flow volume F is more than the allowable supply amount F1 that is the lower limit value of the allowable supply amount, and is the allowable supply amount F2 that is the upper limit value of the allowable supply amount or less. As a result, when the flow volume F is judged as the allowable supply amount F2 that is the upper limit value of the allowable supply amount or less, that is to say, when the flow volume F is more than the allowable supply amount F1 that is the lower limit value of the allowable supply amount and also the flow volume F is the allowable supply amount F2 that is the upper limit value of the allowable supply amount or less, the control device 14 makes the shift to step S204. Meanwhile, when the flow volume F is not judged as the allowable supply amount F2 that is the upper limit value of the allowable supply amount or less, that is to say, when the flow volume F is not judged as more than the allowable supply amount F1 that is the lower limit value of the allowable supply amount or the allowable supply amount F2 that is the upper limit value of the allowable supply amount or less, the control device 14 makes the shift to step S304.

In step S204, the control device 14 controls opening/closing of the gate valves 12*a*, 12*b*, 12*c* so as to keep any two of the gate valves 12*a* 12*b*, 12*c* (in the present embodiment, the gate valves 12*a*, 12*b*) in an open state. That is to say, excess steam is supplied to any two of the scroll type fluid machines 3*a*, 3*b*, 3*c* (in the present embodiment, the scroll type fluid machines 3*a*, 3*b*) of the scroll type fluid machine group 3. As such, efficiency η of the scroll type fluid machine group 3 does not drop lower than the lower limit value η1. After that, the step is returned to step S101 by the control device 14.

In step S304, the control device 14 controls opening/closing of the gate valves 12*a*, 12*b*, 12*c* so as to keep all of the gate valves 12*a*, 12*b*, 12*c* in an open state. That is to say, excess steam is supplied to all of the scroll type fluid machines 3*a*, 3*b*, 3*c* of the scroll type fluid machine group 3. As such, efficiency η of the scroll type fluid machine group 3 does not drop lower than the lower limit value η1. After that, the step is returned to step S101 by the control device 14.

Above description was the explanation of the operation aspect of the waste heat recovery system 1 for the vessel according to the present embodiment. The technical idea of the present invention is not limited to be applied to the above-mentioned scroll type fluid machine 3*a*, 3*b*, 3*c*. Instead, it can also be applied to other scroll type fluid machines having other configurations.

Additionally, the scroll type fluid machines 3*a*, 3*b*, 3*c* can be utilized for, for example, a vessel etc. that obtains propulsion power by using high temperature steam. Moreover, the present scroll type fluid machines 3*a*, 3*b*, 3*c* can be utilized as power machineries that recover waste heat from other instruments and convert the waste heat into rotation power.

As described above, disclosed is the waste heat recovery system 1 for the vessel for supplying, to the steam utilization device 101, steam generated by the steam generation device 2, using waste heat from the main machine 100 as a heat source. With respect to the waste heat recovery system 1 for the vessel, the plurality of scroll type fluid machines 3*a*, 3*b*, 3*c* that is the expansion machines are connected in parallel to one another, and excess steam without being supplied to the steam utilization device 101 is supplied individually to the scroll type fluid machines 3*a*, 3*b*, 3*c* by the opening/closing of gate valves 12*a*, 12*b*, 12*c* arranged in the respective scroll type fluid machines 3*a*, 3*b*, 3*c* respectively. Because of this configuration, excess steam can be selectively supplied to the one of or to the plurality of the scroll type fluid machines 3*a*, 3*b*, 3*c*. As such, waste heat can be efficiently recovered regardless of the flow volume of excess steam.

And, the waste heat recovery system 1 for the vessel further includes the control device 14. With respect to the waste heat recovery system 1 for the vessel, the plurality of the scroll type fluid machines 3*a*, 3*b*, 3*c* are configured to have the same capacity. With respect to the waste heat recovery system 1 for the vessel, when the flow volume of excess steam supplied to the scroll type fluid machines 3*a*, 3*b*, 3*c* exceeds the allowable supply amount F1, F2, that is the upper limit value of the allowable supply amount that is determined from the combination of the scroll type fluid machines 3a, 3b, 3c, the gate valve of any one of the scroll type fluid machine among the plurality of the scroll type fluid machines 3a, 3b, 3c in which excess steam is not supplied is open, whereas when the flow volume of excess steam supplied to the scroll type fluid machines 3a, 3b, 3c is equal to or lower than the lower limit value of the allowable supply amount F1, F2, the gate valve 12a, 12b, 12c of any one of the scroll type fluid machines among the plurality of the scroll type fluid machines in which excess steam is supplied is closed. Because of this configuration, excess steam can be selectively supplied to the one of or the plurality of the expansion machines taking efficiency of expansion machines into consideration from the supply volume of excess steam. As such, waste heat can be efficiently recovered regardless of the flow volume of excess steam.

Hereinafter, an explanation will be given of a waste heat recovery system 1 for a vessel which is an other control aspect of the first embodiment with respect to the waste heat recovery system 1 for the vessel of the present invention with reference to FIG. 5. For the below embodiment, specific explanation for the point that is the same as the embodiment that has been already explained is omitted, and explanation will be given mainly focusing on different parts.

The control device 14 is connected to various devices, for example the gate valves 12a, 12b, 12c, constituting the waste heat recovery system 1 for the vessel, and is capable of controlling the open/closed state of the gate valves 12a, 12b, 12c. Furthermore, the control device 14 is capable of measuring the amount of time when the gate valves 12a, 12b, 12c is open. That is to say, the control device 14 is capable of measuring the frequency of usage of the scroll type fluid machines 3a, 3b, 3c. Furthermore, the control device 14 is connected to the flow volume sensor 13, and thereby the control device 14 can receive signals of flow volume F of excess steam that are detected by the flow volume sensor 13.

An explanation will be given of an operation aspect of the control device 14 with respect to the waste heat recovery system 1 for the vessel having the above configuration.

Figure 5:
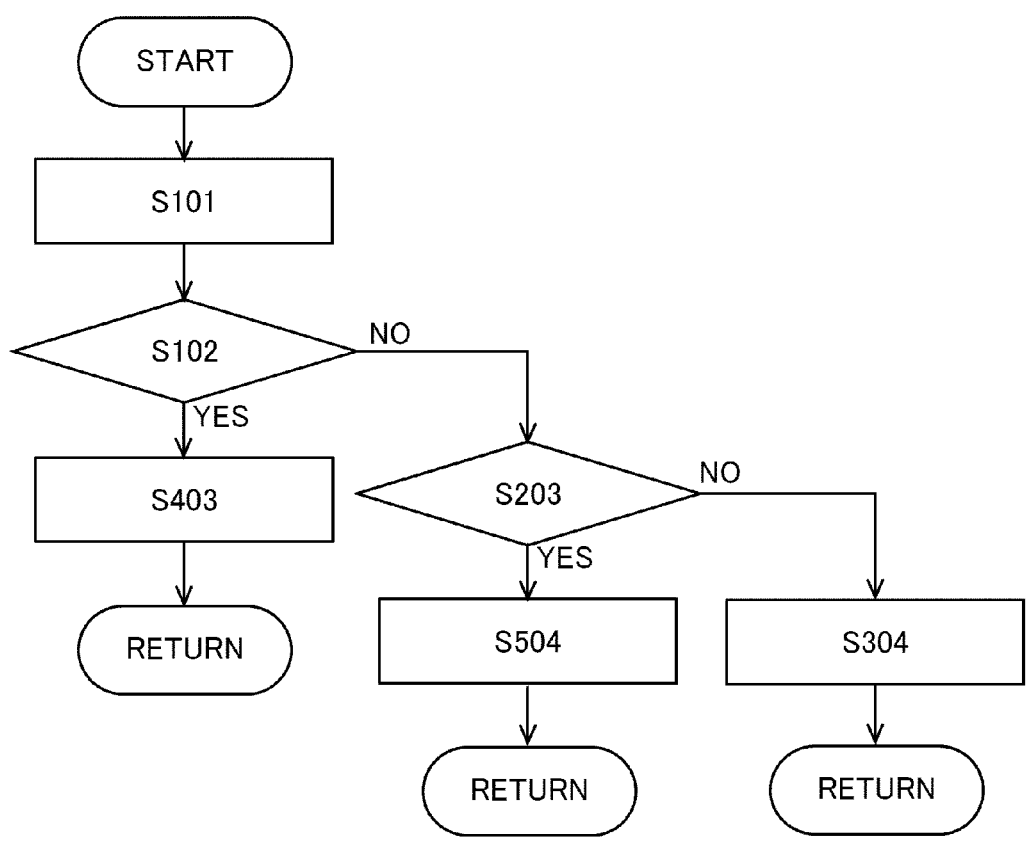
FIG. 5 It is a flowchart showing a control procedure of gate valves according to other embodiment of the waste heat recovery system for the vessel which is the first embodiment of the present invention.

As shown in FIG. 5, the control device 14 controls open/closed state of the gate valves 12a, 12b, 12c in accordance with the following steps.

Since the control aspect from step S101 to step S102 is the same as above control aspect, specific explanation thereof is omitted.

In step S403, the control device 14 controls opening/closing of the gate valves 12a, 12b, 12c so as to keep the one of the gate valves 12a, 12b, 12c (in the present embodiment, the gate valve 12a) in an open state. The one 12a of the gate valves has the shortest amount of time when the gate valve 12a is open among the gate valves 12a, 12b, 12c. That is to say, excess steam is supplied to the least frequently used scroll type fluid machine (in the present embodiment, the scroll type fluid machine 3a) among the scroll type fluid machines 3a, 3b, 3c constituting the scroll type fluid machine group 3. Accordingly, efficiency η of the scroll type fluid machine group 3 does not drop lower than the lower limit value ηl. As such, uneven frequency of using each scroll type fluid machine 3a, 3b, 3c of the scroll type fluid machine group 3 is prevented. After that, the step is returned to step S101 by the control device 14.

Since the control aspect of step S203 is the same as the above control aspect, specific explanation thereof is omitted.

In step S504, the control device 14 controls opening/closing of the gate valves 12a, 12b, 12c so as to keep the one of the gate valves 12a, 12b, 12c (in the present embodiment, the gate valve 12b) in a closed state. The one 12b of the gate valves has the longest amount of time when the gate valve 12b is open among the gate valves 12a, 12b, 12c. That is to say, excess steam is supplied to the scroll type fluid machine other than the most frequently used scroll type fluid machine (in the present embodiment, the fluid machine 3b) among the scroll type fluid machines 3a, 3b, 3c constituting the scroll type fluid machine group 3. As such, efficiency η of the scroll type fluid machine group 3 does not drop lower than the lower limit value ηl. And, uneven frequency of using each scroll type fluid machine 3a, 3b, 3c of the scroll type fluid machine group 3 is prevented. After that, the step is returned to step S101 by the control device 14.

Since the control aspect of step S304 is the same as above control aspect, specific explanation thereof is omitted.

As mentioned above, the control device 14 is programmed to control such that, the gate valve 12a, 12b, 12c of the one expansion machine that is least frequently used among the plurality of expansion machines in which excess steam is not supplied is open, whereas the gate valve 12a, 12b, 12c of the one expansion machine that is most frequently used among the plurality of expansion machines in which excess steam is supplied is closed. Because of this configuration, the frequency of usage of the respective expansion machines connected to one another are kept approximately constant, and thereby individual difference of efficiency of respective expansion machines due to secular change can be reduced. As such, while maintaining the efficiency of the waste heat recovery system 1 for the vessel, waste heat can be efficiently recovered regardless of the flow volume of excess steam.

Hereinafter, an explanation will be given of a waste heat recovery system 20 for a vessel that is a second embodiment with respect to the waste heat recovery system for the vessel of the present invention with reference to FIG. 1, FIG. 6 and FIG. 7. For the below embodiment, specific explanation for the point that is the same as the embodiment that has been already explained is omitted, and explanation will be given mainly focusing on different parts.

With respect to the waste heat recovery system 20 for the vessel, the configuration of the scroll type fluid machine group 3 is different from that of the waste heat recovery system 1 for the vessel.

As shown in FIG. 1, a scroll type fluid machine group 21 is constituted from scroll type fluid machines 21a, 21b, 21c that are expansion machines. The scroll type fluid machines 21a, 21b, 21c convert the steam energy into rotation power and output it. The scroll type fluid machine group 21 is connected to a working medium passage that is connected to the steam utilization device 101 in the vessel. The scroll type fluid machine group 21 is connected to downstream side of the steam utilization device 101. Specifically, the scroll type fluid machines 21a, 21b, 21c are connected to the working medium passage in parallel through working medium passages.

The scroll type fluid machines 21a, 21b, 21c have the different capacity with each other. In the present embodiment, the scroll type fluid machine 21a, the scroll type fluid machine 21b and the scroll type fluid machine 21c have capacities which increase in this order, and the total capacity of the scroll type fluid machine 21a and the scroll type fluid machine 21b is equal to the capacity of the scroll type fluid machine 21*c*. However, the number of the scroll type fluid machines connected and the combination of the capacity is not limited to this.

Next, an explanation will be given of efficiency of the scroll type fluid machine group 21 with respect to the waste heat recovery system 20 for the vessel with reference to FIG. 6.

Figure 6:
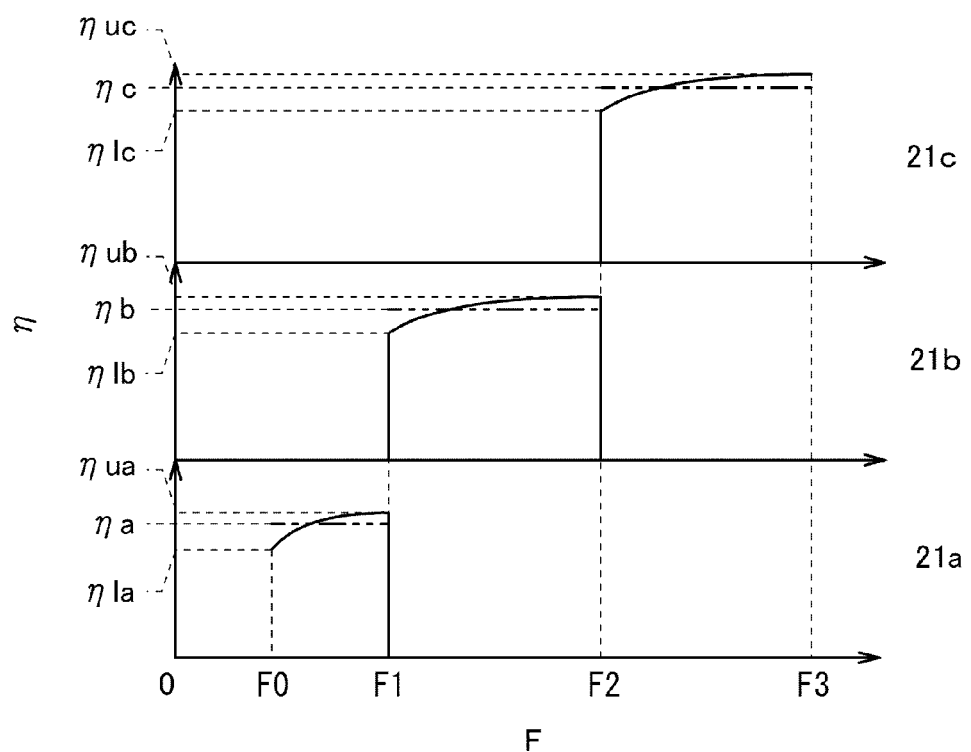
FIG. 6 It is a figure showing efficiency of the scroll type fluid machine according to the waste heat recovery system for the vessel which is the second embodiment of the present invention.
Figure 7:
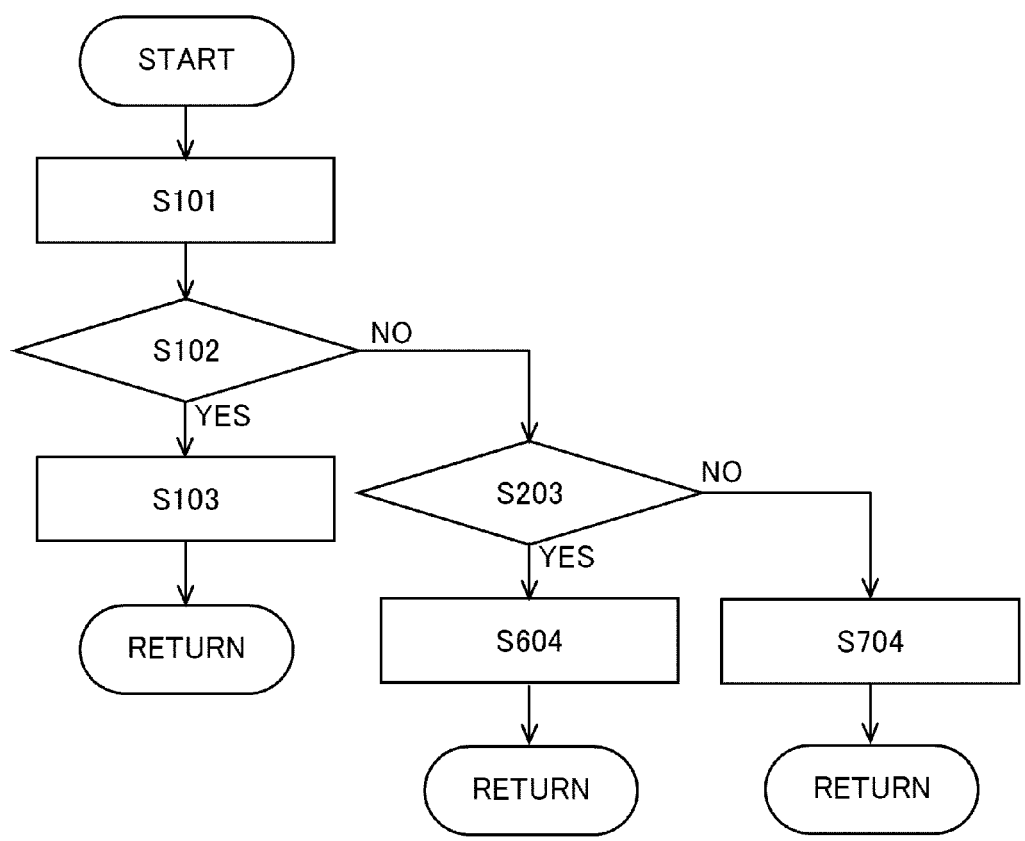
FIG. 7 It is a flowchart showing a control procedure of gate valves according to the waste heat recovery system for the vessel which is the second embodiment of the present invention.

FIG. 6 shows η-F flow volume diagram (η (efficiency)–F (excess steam) flow volume diagram) in accordance with the present embodiment.

A flow volume F1 is the supply amount (referred to as "allowable supply amount F1", hereinafter) of excess steam in which efficiency η of the scroll type fluid machine group 21 reaches an upper limit value ηua when excess steam is supplied to the scroll type fluid machine 21*a* of the scroll type fluid machine group 21. For the scroll type fluid machine group 21 in this state, efficiency η drops when the allowable supply amount F1 or more excess steam is supplied. Also, the allowable supply amount F1 is the supply amount of excess steam in which efficiency η of the scroll type fluid machine group 21 reaches a lower limit value ηlb when excess steam is supplied to the scroll type fluid machine 21*b* of the scroll type fluid machine group 21. For the scroll type fluid machine group 21 in this state, efficiency η further drops when the allowable supply amount F1 or less excess steam is supplied.

A flow volume F2 is the supply amount (referred to as "allowable supply amount F2", hereinafter) of excess steam in which efficiency η of the scroll type fluid machine group 21 reaches an upper limit value ηub when excess steam is supplied to the scroll type fluid machine 21*b* of the scroll type fluid machine group 21. For the scroll type fluid machine group 21 in this state, efficiency η drops when the allowable supply amount F2 or more excess steam is supplied. Also, the allowable supply amount F2 is the supply amount of excess steam in which efficiency η of the scroll type fluid machine group 21 reaches a lower limit value ηlc when excess steam is supplied to the scroll type fluid machine 21*c* of the scroll type fluid machine group 21. For the scroll type fluid machine group 21 in this state, efficiency η further drops when the allowable supply amount F2 or less excess steam is supplied.

A flow volume F3 is the supply amount (referred to as "allowable supply amount F3", hereinafter) of excess steam in which efficiency η of the scroll type fluid machine group 21 reaches an upper limit value ηuc when excess steam is supplied to the scroll type fluid machine 21*c* of the scroll type fluid machine group 21. That is to say, the allowable supply amount F3 is the supply amount of excess steam, to the scroll type fluid machine group 21, when the steam utilization device 101 is not used at all.

Next, an explanation will be given of an aspect of change of efficiency η of the scroll type fluid machine group 21 when the flow volume F is increased from the flow volume F0 to the allowable supply amount F3 with respect to the waste heat recovery system 20 for the vessel.

When the flow volume F is the allowable supply amount F1 or less, excess steam is supplied to the scroll type fluid machine 21*a*. When the flow volume F reaches the allowable supply amount F1, efficiency η of the scroll type fluid machine 21*a* reaches the upper limit value ηua. That is to say, the allowable supply amount F1 is the upper limit value of the allowable supply amount of the scroll type fluid machine group 21 in this state. And, efficiency η of the scroll type fluid machine group 21 (scroll type fluid machine 21*a*) between the flow volume F0 and the allowable supply amount F1 can be indicated as a mean efficiency ηa (see two-dotted line diagram in FIG. 6).

When the flow volume F exceeds the allowable supply amount F1, excess steam is supplied to the scroll type fluid machine 21*b* that has a larger capacity than the scroll type fluid machine 21*a*. Accordingly, efficiency η of the scroll type fluid machine group 21 drops. In this case, efficiency η of the scroll type fluid machine group 21 (scroll type fluid machine 21*b*) reaches the lower limit value ηlb. When the flow volume F reaches the allowable supply amount F2, efficiency η of the scroll type fluid machine group 21 reaches the upper limit value ηub. That is to say, the allowable supply amount F2 is the upper limit value of the allowable supply amount of the scroll type fluid machine group 21 in this state. And, efficiency η of the scroll type fluid machine group 21 between the flow volume F1 to the allowable supply amount F2 can be indicated as a mean efficiency ηb (see two-dotted line diagram in FIG. 6).

When the flow volume F exceeds the allowable supply amount F2, excess steam is supplied to the scroll type fluid machine 21*c* that has a larger capacity than the scroll type fluid machine 21*b*. Accordingly, efficiency η of the scroll type fluid machine group 21 drops. In this case, efficiency η of the scroll type fluid machine group 21 (scroll type fluid machine 21*c*) reaches the lower limit value ηlc. When the flow volume F reaches the allowable supply amount F3, efficiency η of the scroll type fluid machine group 21 reaches the upper limit value ηuc. That is to say, the allowable supply amount F3 is the upper limit value of the allowable supply amount of the scroll type fluid machine group 21 in this state. And, efficiency η of the scroll type fluid machine group 21 between the flow volume F2 and the allowable supply amount F3 can be indicated as a mean efficiency ηc (see two-dotted line diagram in FIG. 6).

Next, an explanation will be given of an aspect of change in efficiency η of the scroll type fluid machine group 21 when the flow volume F is decreased from the allowable supply amount F3 to the flow volume F0 with respect to the waste heat recovery system 20 for the vessel.

When the flow volume F is the allowable supply amount F3, excess steam is supplied to the scroll type fluid machine 21*c*. When the flow volume F reaches the allowable supply amount F2, efficiency η of the scroll type fluid machine group 21 (scroll type fluid machine 21*c*) reaches the lower limit value ηlc. That is to say, the allowable supply amount F2 is the lower limit value of the allowable supply amount of the scroll type fluid machine group 21 in this state.

When the flow volume F falls below the allowable supply amount F2, in order to prevent efficiency η from dropping lower than the lower limit value ηlc when the supply volume is equal to or lower than the allowable supply amount F2, excess steam is supplied to the scroll type fluid machine 21*b* that has a smaller capacity than the scroll type fluid machine 21*c*. Accordingly, efficiency η of the scroll type fluid machine group 21 increases. In this case, efficiency η of the scroll type fluid machine group 21 (scroll type fluid machine 21*b*) is the upper limit value ηub. When the flow volume F reaches the allowable supply amount F1, efficiency η of the scroll type fluid machine group 21 reaches the lower limit value ηlb. That is to say, the allowable supply amount F1 is the lower limit value of the allowable supply amount of the scroll type fluid machine group 21 in this state.

When the flow volume F falls below the allowable supply amount F1, in order to prevent efficiency η from dropping lower than the lower limit value ηlb when the supply volume is equal to or lower than the allowable supply amount F1, excess steam is supplied to the scroll type fluid machine 21*a* that has a smaller capacity than the scroll type fluid machine 21b. Accordingly, efficiency η of the scroll type fluid machine group 21 increases. In this case, efficiency η of the scroll type fluid machine group 21 (scroll type fluid machine 21a) is the upper limit value qua. When the flow volume F reaches the flow volume F0, efficiency η of the scroll type fluid machine group 21 reaches the lower limit value ηla.

With respect to the waste heat recovery system 20 for the vessel, the capacity of the scroll type fluid machine 21c is equal to the total capacity of the scroll type fluid machine 21a and the scroll type fluid machine 21b. That is to say, when the flow volume F is equal to or more than the allowable supply amount F2, excess steam can be supplied to the scroll type fluid machine 21a and the scroll type fluid machine 21b. However, the mean efficiency ηa of the scroll type fluid machine 21a and the mean efficiency ηb of the scroll type fluid machine 21b is less than the mean efficiency ηc of the scroll type fluid machine 21c. Accordingly, in order to keep efficiency η of the scroll type fluid machine group 21 high, the scroll type fluid machine that has a large capacity is preferentially selected for supplying excess steam. Also, on combining the plurality of the scroll type fluid machines to which excess steam is supplied, the scroll type fluid machine that has a large capacity is preferentially selected so as to minimize the number of the scroll type fluid machines to which excess steam is supplied.

Hereinafter, an explanation will be given of a waste heat recovery system 20 for a vessel which is the second embodiment with respect to the waste heat recovery system for the vessel of the present invention with reference to FIG. 1 and FIG. 7. For the below embodiment, specific explanation for the point that is the same as the embodiment that has been already explained is omitted, and explanation will be given mainly focusing on different parts.

As shown in FIG. 1, the control device 14 controls open/closed state of the gate valves 12a, 12b, 12c in accordance with the following steps.

Since the control aspect from step S101 to step S102 is the same as above control aspect, specific explanation thereof is omitted.

In step S103, the control device 14 controls opening/closing of the gate valves 12a, 12b, 12c so as to keep only the gate valve 12a, that is for supplying excess steam to the scroll type fluid machine 21a, in an open state. That is to say, excess steam is supplied to the scroll type fluid machine 21a that has the smallest capacity among the scroll type fluid machine group 21. Accordingly, efficiency η of the scroll type fluid machine group 21 does not drop below the lower limit value ηla. After that, the step is returned to step S101 by the control device 14.

Since the control aspect of step S203 is the same as the above control aspect, specific explanation thereof is omitted.

In step S604, the control device 14 controls opening/closing of the gate valves 12a, 12b, 12c so as to keep only the gate valve 12b, that is for supplying excess steam to the scroll type fluid machine 21b, in an open state. That is to say, excess steam is supplied to the scroll type fluid machine 21b among the scroll type fluid machine group 21. The scroll type fluid machine 21b has a larger capacity than the scroll type fluid machine 21a, and has a smaller capacity than the scroll type fluid machine 21c. Accordingly, efficiency η of the scroll type fluid machine group 21 does not drop lower than the lower limit value ηlb. After that, the step is returned to step S101 by the control device 14.

In step S704, the control device 14 keeps only the gate valve 12c, that is for supplying excess steam to the scroll type fluid machine 21c, in a open state. That is to say, excess steam is supplied to the scroll type fluid machine 21c that has a larger capacity than the scroll type fluid machines 21a, 21b among the scroll type fluid machine group 21. Accordingly, efficiency η of the scroll type fluid machine group 21 does not drop lower than the lower limit value ηlc. After that, the step is returned to step S101 by the control device 14.

As described above, the waste heat recovery system 20 for the vessel further includes the control device 14. The plurality of scroll type fluid machines 21a, 21b, 21c are configured from a combination of different capacity. The gate valves 12a, 12b, 12c are open/closed such that, the flow volume of excess steam is included, at a combination in which the number of the scroll type fluid machines 21a, 21b, 21c is minimum, in a range between the allowable supply amount F1 that is a lower limit value of the allowable supply amount and the allowable supply amount F2 that is an upper limit value of the allowable supply amount, or in a range between the allowable supply amount F2 that is the lower limit value of the allowable supply amount and the allowable supply amount F3 that is the upper limit value of the allowable supply amount that is determined from the combination of the scroll type fluid machines 21a, 21b, 21c. Because of this configuration, excess steam can be selectively supplied to the most suitable combination of the scroll type fluid machines 21a, 21b, 21c taking efficiency of the scroll type fluid machines 21, 21b, 21c into consideration from the supply volume of excess steam. As such, waste heat can be efficiently recovered regardless of the flow volume of excess steam.

INDUSTRIAL APPLICABILITY

The present invention can be utilized to waste heat recovery system for a vessel.

What is claimed is:

1. A waste heat recovery system for a vessel for supplying, to a plurality of scroll expanders, steam generated by a heat exchanger, using waste heat from a main machine as a heat source, comprising:
an electronic controller
wherein the plurality of scroll expanders are connected in parallel to one another,
the steam is supplied individually to the plurality of scroll expanders by opening or closing of gate valves arranged in the respective scroll expanders,
each of the plurality of scroll expanders has a different capacity than each of the other scroll expanders of the plurality of scroll expanders, and
the electronic controller is programmed to control such that:
a gate valve is opened or closed such that flow volume of the steam is included, at a combination in which a number of scroll expanders is minimized, in a range between a lower limit value and an upper limit value of an allowable supply amount that is determined from the combination of the scroll expanders where the steam is supplied.

2. A waste heat recovery system for a vessel for supplying, to a plurality of scroll expanders, steam generated by a heat exchanger, using waste heat from a main machine as a heat source, comprising:
an electronic controller
wherein the plurality of scroll expanders are connected in parallel to one another, the steam is supplied individually to the plurality of scroll expanders by opening or closing of gate valves arranged in the respective scroll expanders, the plurality of scroll expanders are configured to have the same capacity, and the electronic controller is programmed to control such that:

when flow volume of the steam supplied to the scroll expanders exceeds an upper limit value of an allowable supply amount that is determined from the combination of the scroll expanders where the steam is supplied, a gate valve of a scroll expander that is least frequently used among the plurality of scroll expanders in which the steam is not supplied is opened first while all other gate valves are closed, whereas when the flow volume of the steam supplied to the scroll expanders is equal to or lower than a lower limit value of the allowable supply amount, a gate valve of a scroll expander that is most frequently used among the plurality of scroll expanders in which the steam is supplied is closed first while all other gate valves are opened.

* * * * *